United States Patent [19]

Bridge, Jr.

[11] Patent Number: 4,531,259
[45] Date of Patent: Jul. 30, 1985

[54] MEAT TENDERIZER APPARATUS

[76] Inventor: Edward W. Bridge, Jr., c/o Bridge Machine Co., Inc., Kennedy St., Palmyra, N.J. 08065

[21] Appl. No.: 547,024

[22] Filed: Oct. 31, 1983

[51] Int. Cl.³ .............................................. A22C 9/00
[52] U.S. Cl. ...................................................... 17/26
[58] Field of Search ..................................... 17/26, 28

[56] References Cited

U.S. PATENT DOCUMENTS

| | | | |
|---|---|---|---|
| 1,371,065 | 3/1921 | Becker | 17/26 |
| 1,600,002 | 9/1926 | Kingery | 17/26 |
| 1,639,854 | 8/1927 | McBride | 17/26 |
| 1,982,487 | 11/1934 | Swift . | |
| 2,279,071 | 4/1942 | Spang . | |
| 2,606,341 | 8/1952 | Dolan | 17/26 |
| 3,222,713 | 12/1965 | Stein et al. . | |
| 3,644,125 | 2/1972 | Lobiondo et al. . | |
| 3,716,893 | 2/1973 | Vogelsang . | |
| 3,823,441 | 7/1974 | Bridge, Jr. . | |

*Primary Examiner*—Willie G. Abercrombie
*Attorney, Agent, or Firm*—Z. T. Wobensmith, III

[57] ABSTRACT

Meat tenderizer apparatus is provided, in which a piece of meat to be tenderized is fed between a set of top and bottom rotary serrated knives, which make intermittent cuts in the surface of the piece of meat regardless of its contour or varying thickness. The set of bottom knives is carried on a fixed center rotating shaft, and the set of top knives is carried on a floating shaft, which shaft is spring urged downwardly at each end towards the piece of meat.

3 Claims, 5 Drawing Figures

MEAT TENDERIZER APPARATUS

BACKGROUND OF THE INVENTION

1. Field of the Invention

This invention relates to meat tenderizer apparatus of the type wherein a piece of meat is tenderized by passing it through a top and bottom set of rotary serrated knives, the bottom set being carried on a fixed rotating shaft, and the top set carried on a spring urged floating shaft.

2. Description of the Prior Art

The tenderizing or massaging of meat such as boneless ham, pork pieces, and beef or poultry pieces of irregular shape is difficult to accomplish with commonly available tenderizing equipment.

The usual method of tenderizing meat is to pass the piece of meat between one or more sets of rotary knives that are carried on shafts having fixed center locations. This structure works satisfactorily on flat pieces of meat of uniform thickness but does not operate satisfactorily on pieces of meat of irregular shape, which pieces can vary in thickness from front to back and from side to side.

Examples of available machines are shown in the U.S. patents to E. W. Bridge, Jr., U.S. Pat. Nos. 3,823,441; S. S. Stein et al., 3,222,713; W. Swift, 1,982,487; J. P. Spang, 2,279,071; F. H. Vogelsang, 3,716,893; and Lobiondo, 3,644,125.

The apparatus of my invention is useful for tenderizing of pieces of meat of flat or irregular shape, has none of the disadvantages of the prior apparatus, and provides may advantages.

SUMMARY OF THE INVENTION

Meat tenderizer apparatus is provided, wherein an irregularly shaped piece of meat is tenderized by passing it through a set of rotating top and bottom knives, with the bottom set on a shaft having a fixed center and the top set on a floating spring urged shaft, which shaft is urged downwardly towards the piece of meat to be tenderized.

The principal object of the invention is to provide meat tenderizer apparatus for tenderizing flat or irregularly shaped pieces of meat.

A further object of the invention is to provide meat tenderizer apparatus which quickly and economically tenderizes pieces of meat.

A further object of the invention is to provide meat tenderizer apparatus which is usable for tenderizing various kinds of meat.

A further object of the invention is to provide meat tenderizing apparatus which can be easily adjusted to accommodate meat pieces of various thicknesses.

Other objects and advantageous features of the invention will be apparent from the description and claims.

DESCRIPTION OF THE DRAWINGS

The nature and characteristic features of the invention will be more readily understood from the following description taken in accordance with the accompanying drawings forming part hereof in which.

Figure 1:
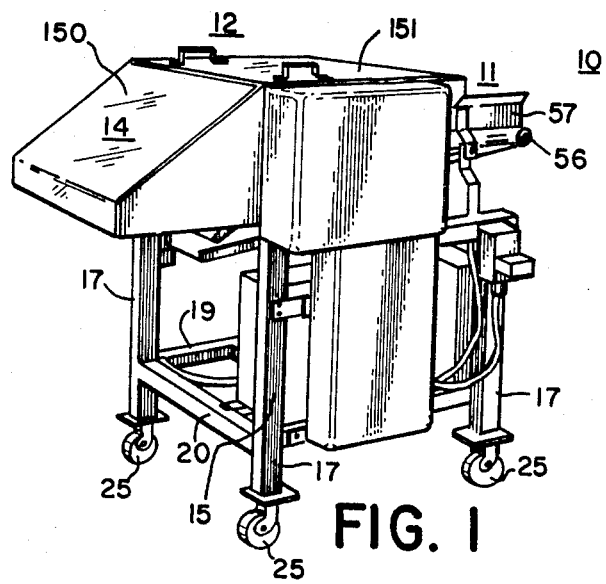
FIG. 1 is a view in perspective of the meat tenderizer apparatus of the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 5 inclusive, the meat tenderizer apparatus 10 includes a meat feeder section 11, a treatment section 12, and a discharge or delivery section 14.

The meat tenderizer apparatus 10 includes a frame 15 with vertical legs 17, lower horizontal side rails 18 and 19, and end rails 20 connecting the legs 17, upper horizontal side rails 21 and 22, and end rails 23 connecting the legs 17. The legs 17 at their lower ends are fitted with casters 25 to permit of easy movement of the apparatus 10. The bottom side rails 18, 19 have a driving motor (not shown) mounted therebetween, which motor is of well known type and can be of the constant or variable speed type.

The motor (not shown) has an output shaft (not shown) with a sprocket (not shown) which is engaged with a sprocket chain 26, which engages a sprocket gear 27 carried on a shaft 28, which is journaled in bearings 29 and 30, mounted to upright frame plates 31 and 32, mounted on the upper side rails 21 and 22. The bearings 29 and 30 are mounted to the plates 31 and 32 by cap screws 33 of well known type.

The shaft 28 between the bearings 29 and 30 has a plurality of serrated disc like knife blades 35 removably secured thereto, and which are separated by spacer washers 36.

In the preferred embodiment, the shaft 28 can be threaded (not shown) and the knife blades 35 also threaded (not shown) for attachment and removal to the shaft 28 as desired.

The shaft 28 at the end opposite to gear 27 has a sprocket gear 40 thereon which is engaged by a sprocket chain 41, engaged with an idler sprocket 42 carried on shaft 43 from bearing block 44, which is mounted to frame plate 32 by cap screw 45, and adjustable to take up the slack in chain 41. The sprocket chain 41 is engaged with a sprocket gear 46 journaled on an idler shaft 47 mounted on plate 32. The sprocket gear 46 has a driving gear 50 thereon, which is engaged with a driving gear 51 carried on a stub shaft 52 mounted to frame plate 32.

Figure 2:
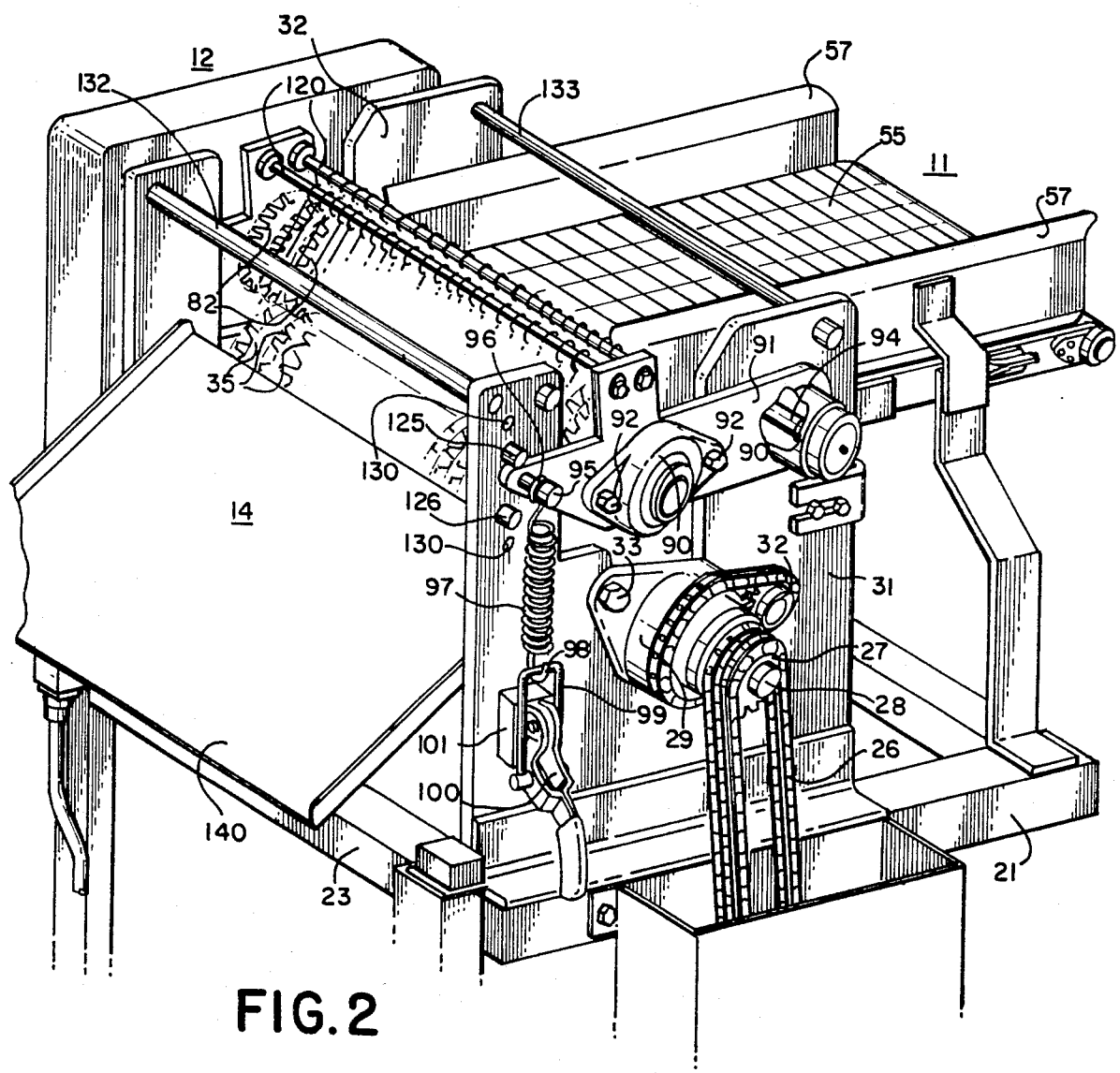
FIG. 2 is a fragmentary enlarged perspective view, of the apparatus of FIG. 1, with the outer cover plates removed.
Figure 3:
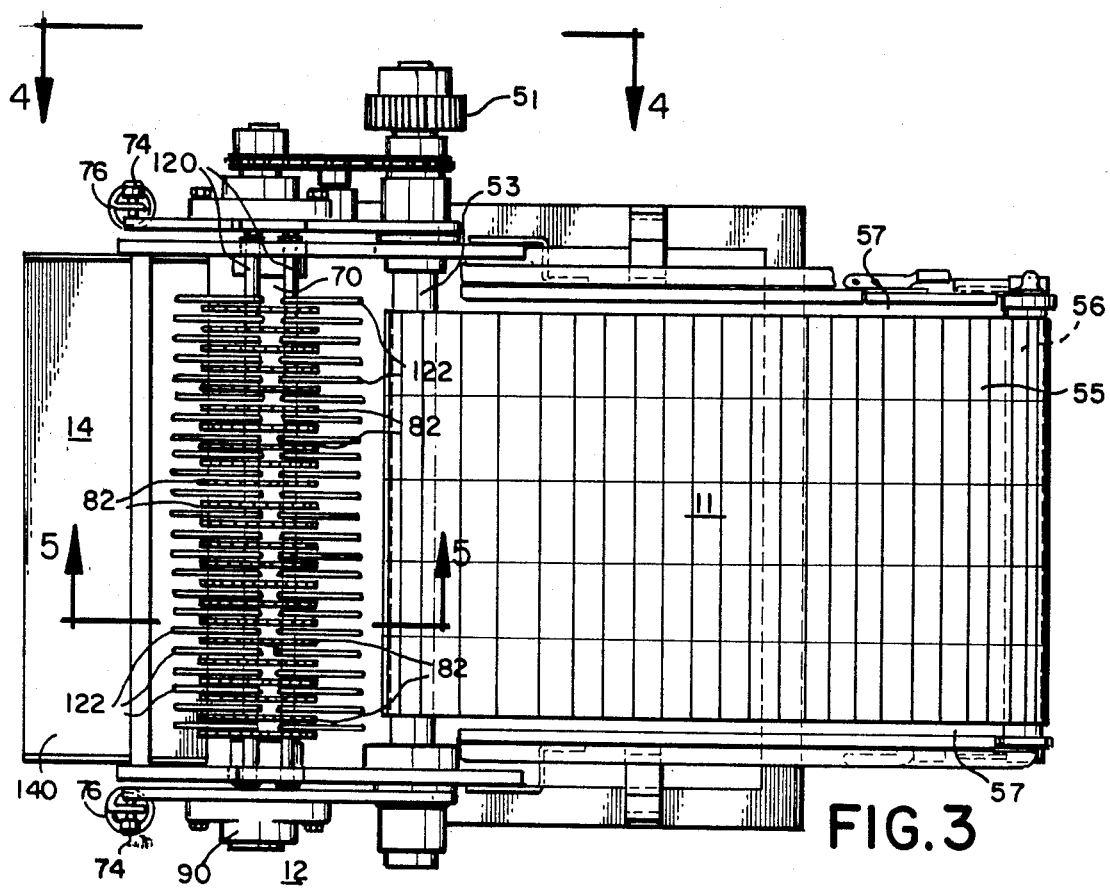
FIG. 3 is a top elevational view of the apparatus of the invention.
Figure 5:
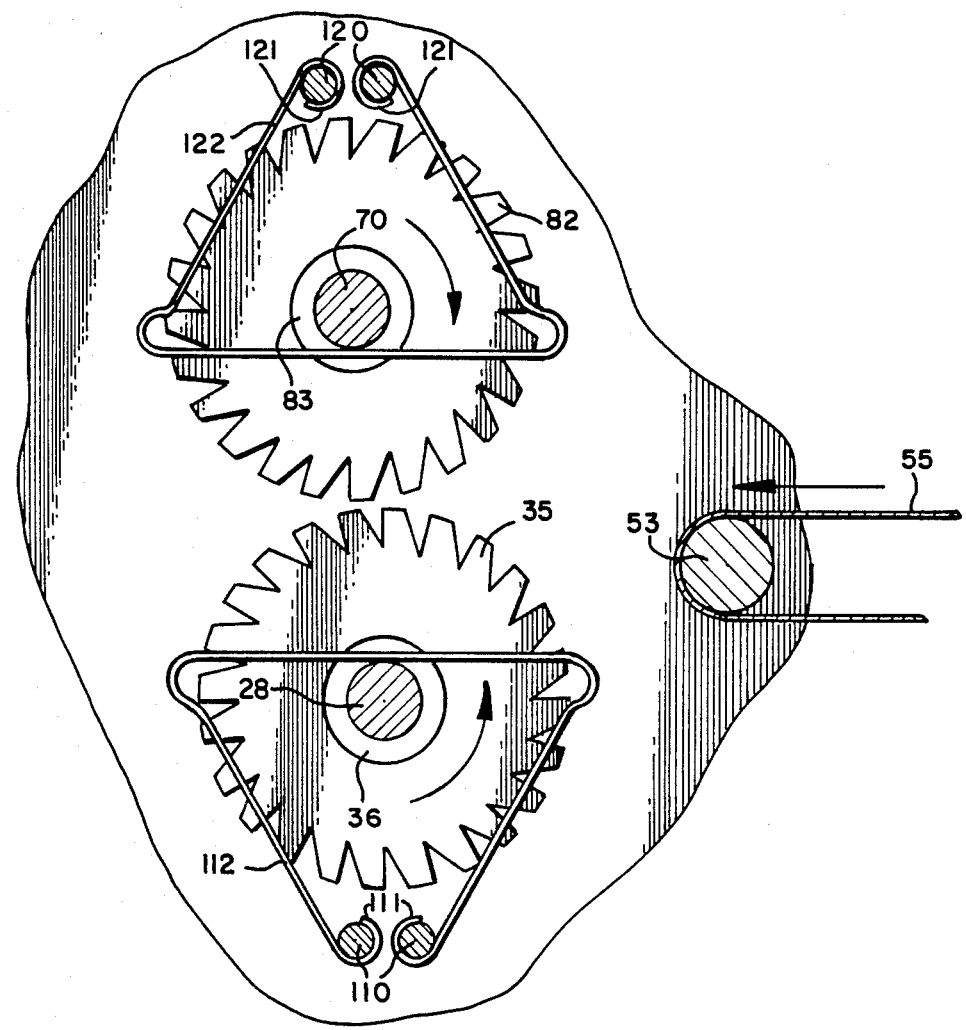
FIG. 5 is a fragmentary vertical sectional view, enlarged, taken approximately on the line 5—5 of FIG. 3.

A shaft 53 is provided engaged with an endless feeder belt 55 which belt extends to the right as seen in FIGS. 2, 3 and 5 and is carried on an idler shaft 56 mounted to frame extension rails 57 which extend to the right from plates 31 and 32, and form the feeder section 11.

The belt 55 can be of any desired type capable of sterilization but is preferably of well known metal link construction and is supported between the shafts 53 and 56 by rods (not shown) connected to the rails 57.

The shaft 53 has a sprocket thereon (not shown) which can be engaged by an additional sprocket chain (not shown) and driven by the driving motor (not shown) for belt 55 movement to feed pieces of meat (not shown) to be tenderized.

Figure 4:
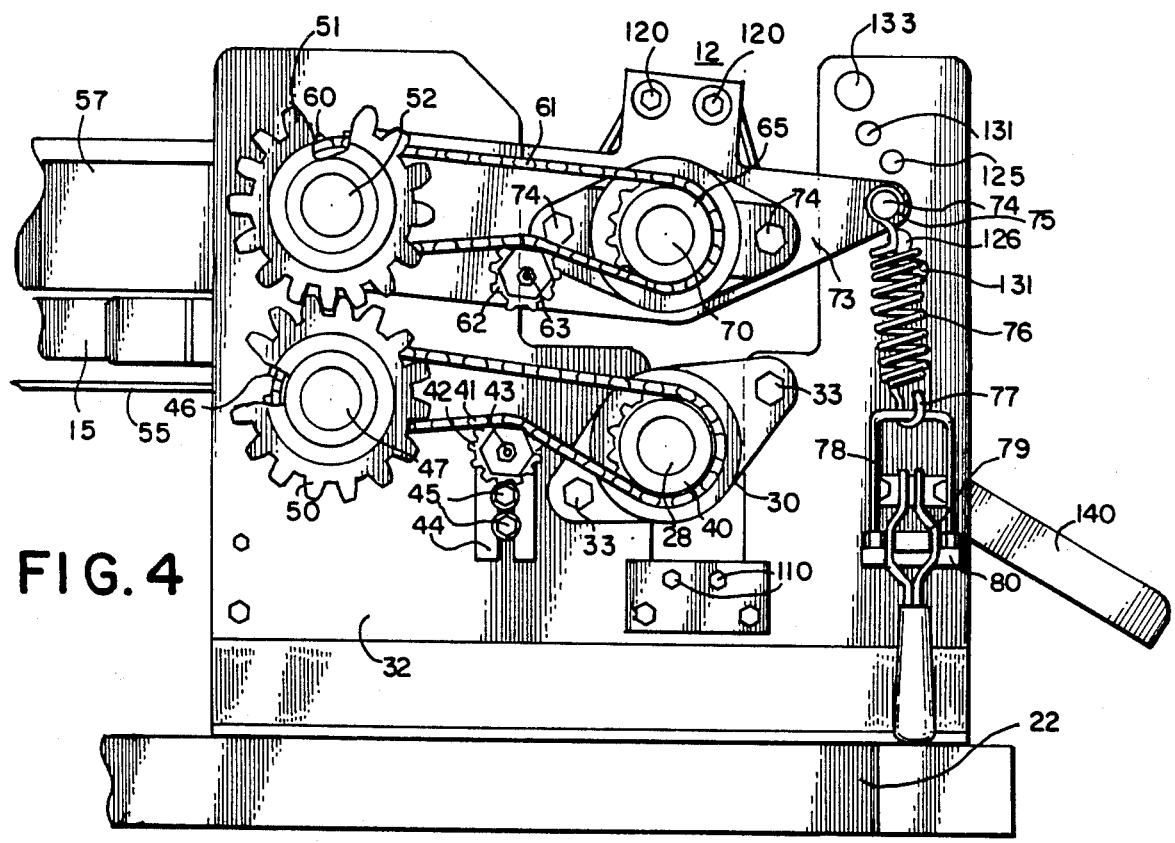
FIG. 4 is a fragmentary vertical sectional view, taken approximately on the line 4—4 of FIG. 3.

The gear 51 has a sprocket gear 60 attached thereto and engaged with a sprocket chain 61, which extends to a sprocket gear 62 journaled on a stub shaft 63, mounted to arm 73. The sprocket chain 61 is also engaged with a sprocket gear 65, mounted on shaft 70, which is journaled in bearing 71 attached to arm 73 by bolts 33. The arm 73 is carried on shaft 52 and extends forwardly as seen in FIGS. 2, 3 and 4 with a shoulder bolt 74 therein, which is engaged by the end coil 75 of a spring 76, which has its opposite end coil 77 engaged with a clamp arm 78, with a handle 79 engaged therewith, and mounted to a block 80 on side plate 32, to permit of engaging spring 76 for tension as required.

The shaft 70 extends transversely across the apparatus 10 and carries a plurality of serrated disc like knife blades 82 thereon, which are separated by spacer washers 83 of well known type. The shaft 70 can be threaded (not shown) and the knife blades 82 can also be threaded (not shown) for attachment to the shaft 70 in well known manner for use, and removal for replacement as required.

The shaft 70 is journaled at its opposite end in a bearing 90, mounted to an arm 91, by bolts 92, which arm 91 has a bearing 93 journaled on a stub shaft 94, carried in the frame plate 31. The arm 91 extends forwardly as seen in FIG. 2, and is provided with a shoulder bolt 95, which is engaged by an end coil 96 of a spring 97, which has its opposite end coil 98 engaged with a clamp arm 99, with an arm 100 engaged therewith and mounted to a block 101 on upright plate 31, to provide spring tension on spring 97 as required.

Two shafts 110 are provided attached to and extending transversely across the apparatus 10 between upright frame plates 31 and 32, below the knife blades 35, and have the ends 111 of a plurality of stripper wires 112 engaged therewith. The stripper wires 112 are of approximate triangular configuration and as shown in FIG. 5 extend between the knife blades 35 and serve to keep meat particles (not shown) moving between the rotating knife blades 35 and 82 and from jamming the blades 35.

The arms 73 and 91 also have a pair of shafts 120 attached thereto and extending transversely across the apparatus 10 above the knife blades 82, with the ends 121 of a plurality of stripper wires 122 engaged therewith. The stripper wires 122 are of approximate triangular configuration and as shown in FIG. 5 extend between the blades 82 and serve to keep the meat pieces (not shown) moving between rotating knife blades 35 and 82 and from jamming the blades 82.

It should be noted that the plates 31 and 32 are respectively provided with stops 125 and 126 which limit the upward and downward travel of the arms 73 and 91, and the plates 31, 32 also have a plurality of holes 130 and 131, into which the respective shoulder bolts 74 and 95 can be inserted to provide for fixed locations of the shaft 70.

The plates 31 and 32 have front and rear transverse connecting rods 132 and 133 engaged therewith to retain the plates 31 and 32 in spaced relation.

The apparatus 10 is also provided with a plate 140 which is attached on the upright frame plates 31 and 32 and which serves to carry the treated meat pieces (not shown) for delivery.

As illustrated in FIG. 1, the apparatus 10 can be provided with a front cover plate 150, a top cover plate 151, and side cover plates 152 which can be fastened to the frame of the apparatus 10 in well known manner.

The mode of operation will now be pointed out. When it is desired to tenderize pieces of meat the motor (not shown) is actuated which causes belt 55 to move towards the treatment section 12 and to carry any pieces of meat (not shown) towards the rotary knives 35 and 82. The blades 35 and 82 through sprocket chain 26, gear 27, shaft 28, gear 40, sprocket chain 41, gear 46, gear 50, gear 51, gear 60, sprocket chain 61, shaft 70, rotate as shown in FIG. 5 to draw in pieces of meat (not shown) delivered thereto by belt 55 for treatment. As the meat pieces (not shown) are drawn between the rotating sets of knife blades 35 and 82 the knife blades 82 can move upwardly and downwardly as determined by the stops 125 and 126 in accordance with the contour of the meat pieces to be tenderized. The spring 76 and 97 cause the shaft 70 and blades 82 to press downwardly against the meat piece being tenderized, but allow the ends of the shaft 70 to move upwardly and downwardly in accordance with the side to side meat piece contour, as well as moving upwardly and downwardly with the front to back meat piece contour.

Accordingly, meat pieces that are of unusual contour, as well as meat pieces of uniform contour, can be effectively treated without destroying their shape, and with uniform treatment regardless of the contour. If desired, for a specific thickness, should the operator wish to fix one or both sides of the shaft 70, it is necessary only to engage one or both of the bolts 74 or 95 in holes 130 or 131.

It will thus be seen that structure has been provided with which the objects of the invention are achieved.

I claim:

1. Apparatus for tenderizing pieces of meat which may be of even or of irregular shape which comprises
    a meat feeder means,
    a meat treatment means to receive and treat meat from said meat feeder means which includes
        a rotating shaft transversely mounted in said apparatus on fixed center end locations,
        a plurality of spaced serrated rotary knife blades carried by said shaft,
        at least two fixed transverse shafts attached to said apparatus below said shaft,
        a plurality of stripper wires mounted to said fixed shafts which extend upward and between said rotary knife blades,
        a second rotating shaft transversely mounted in said apparatus above said first shaft,
        said second shaft has its ends journaled in arms that are independent of each other, and pivotally attached to said apparatus,
        resilient means attached to each said arm urging said arm and said shaft end towards said first shaft,
        a plurality of spaced serrated rotary knife blades carried by said second shaft,
        at least two transverse shafts attached to said arms above said second shaft,
        a plurality of stripper wires mounted to said fixed transverse shafts which extend down and between said rotary knife blades, and
        driving means to rotate said rotating shafts and said blades.

2. Apparatus as defined in claim 1 in which said meat feeder means includes
    an endless belt, and
    driving means for advancing said belt towards said blades.

3. Apparatus as defined in claim 1 in which said stripper wires are of triangular configuration.

\* \* \* \* \*